United States Patent [19]
Sharp

[11] Patent Number: 5,456,502
[45] Date of Patent: * Oct. 10, 1995

[54] FITTINGS FOR USE WITH FIN STRENGTHENED DOUBLE WALL PIPELINE SYSTEMS

[76] Inventor: Bruce R. Sharp, 1741 Hawaii Ct., Marco Island, Fla. 33937

[*] Notice: The portion of the term of this patent subsequent to Nov. 9, 2010 has been disclaimed.

[21] Appl. No.: 150,361

[22] Filed: Nov. 9, 1993

Related U.S. Application Data

[63] Continuation-in-part of Ser. No. 876,505, Apr. 30, 1992, Pat. No. 5,259,651, which is a continuation-in-part of Ser. No. 680,513, Apr. 4, 1991, abandoned.

[51] Int. Cl.$^6$ .................................................. F16L 9/18
[52] U.S. Cl. .................... 285/133.1; 285/156; 285/343; 285/138; 138/114
[58] Field of Search ................... 285/133.1, 138, 285/156, 343; 138/114, 148

[56] References Cited

U.S. PATENT DOCUMENTS

| | | | |
|---|---|---|---|
| 2,956,586 | 10/1960 | Zeigler et al. | 285/133.1 |
| 3,980,112 | 9/1976 | Basham | 285/133.1 |
| 4,122,968 | 10/1978 | Germain | 138/114 |
| 4,149,568 | 4/1979 | Kuntz et al. | 138/114 |
| 4,274,549 | 6/1981 | Germain | 138/114 |
| 4,871,196 | 10/1989 | Kingsford | 285/138 |
| 4,886,305 | 12/1989 | Martin | 285/133.1 |
| 4,922,971 | 5/1990 | Grantham | 285/133.1 |

*Primary Examiner*—Eric K. Nicholson
*Attorney, Agent, or Firm*—Charles R. Wilson

[57] ABSTRACT

A double wall compression fitting is dimensioned for attachment to a double wall pipeline system having an inner pipeline and an outer pipeline. The pipelines have longitudinally running support fins running between them to maintain a spaced relationship. The fitting is comprised of an inner housing having at least two terminals, an outer housing encasing the inner housing in a manner to form an annular space therebetween and a compression connecting assembly. The compression connection assembly connects the inner and outer housings to the double wall pipeline system so that the annular space between the housings is in communication with an annular space between the pipelines of the double wall pipeline system. The compression connecting assembly includes a coupler with means to compress it to form a compression seal with the outer pipeline and a spacer. The spacer has a set of indents to accommodate the support fins of the double wall pipeline system and means of communication therethrough.

28 Claims, 7 Drawing Sheets

FITTINGS FOR USE WITH FIN STRENGTHENED DOUBLE WALL PIPELINE SYSTEMS

This is a continuation-in-part of Ser. No. 07/876,505, filed Apr. 30, 1992 "Double Wall Fittings For Use With Double Wall Pipeline System, now U.S. Pat. No. 5,259,651, which is a continuation-in-part of Ser. No. 07/680,513, filed Apr. 4, 1991, "Double Wall Fittings For Use With Double Wall Pipeline Systems", now abandoned.

This invention relate to fittings for use on pipeline systems for conveying liquids. More particularly, the invention relates to double walled fittings for use on fin strengthened double wall 10 pipeline systems.

BACKGROUND OF THE INVENTION

Pipelines are used extensively for conveying liquids. One area where pipelines are used is in the transporting of liquid from bulk storage tanks. Many types of liquids are stored in bulk, both above ground and underground. A special problem exists with leaks in the pipelines used in connection with underground storage tanks. If the liquid being conveyed is a danger to the environment or the health when not controlled, substantial damage can occur before the leak is even detected. A good example of this are the pipelines used to convey liquid gasoline at retail gasoline service stations. Necessarily, these stations are in populated areas and therefore there is always a danger associated with leaks from the tanks or pipelines associated therewith.

Leaked gasoline poses a hazard to the environment as well as an obvious health hazard. Any leak which develops is normally very slow initially. This means that the leak is difficult to detect until a substantial amount of gasoline has leaked. By that time environmental damage and possible health problems have occurred.

Various attempts have been made to alleviate the problems associated with underground pipelines, including use of double walled pipeline systems. In this type of system, an outer pipeline wall acts as a containment vessel if an inner pipeline wall develops a leak. A slow leak in the pipeline is satisfactorily contained. A particularly attractive double wall pipeline system which is becoming popular has a set of longitudinally running internal support fins between the inner and outer pipelines for strengthening purposes. However, installation of these double walled pipelines is difficult.

A particular problem experienced with double wall pipeline systems having the internal support fins is the need for special fittings. Straight fittings, elbows and T-fittings are often used in connecting a pipeline terminal to another pipeline terminal, dispenser, etc. Known fittings used on conventional single wall pipelines are not able to maintain a segregation of the inner pipeline flow channel from the outer pipeline flow channel. The lack of reliable easy to use fittings for use on the double wall pipeline systems of the type discussed above has reduced the attractiveness of such systems.

There has now been discovered double wall fittings especially adapted for double wall pipeline systems having internal support fins. The fittings solve many of the problems inherent with the existing fitting systems. The fittings of this invention are economical and provide a means of connecting not available previously.

SUMMARY OF THE INVENTION

A double wall compression fitting is dimensioned for attachment to a double wall pipeline system having an inner pipeline and an outer pipeline with longitudinally running support fins. The fitting is comprised of an inner housing having at least two terminals, an outer housing encasing the inner housing in a manner to form an annular space therebetween and a compression connecting assembly. The connecting assembly is capable of connecting the inner and outer housings to the double wall pipeline system so that an annular space between the housings is in communication with an annular space between the inner and outer pipelines of the double wall pipeline system. The compression connecting assembly has a coupler with means to form a compression seal with the outer pipeline and a spacer to ensure that the outer pipeline is not crushed. The spacer is characterized in having a set of indents around its periphery to accommodate the fins of the pipeline system and also in having means of communication between the annular space of the double wall pipeline system and the annular space between the housings.

DETAILED DESCRIPTION OF THE INVENTION

Figure 1:
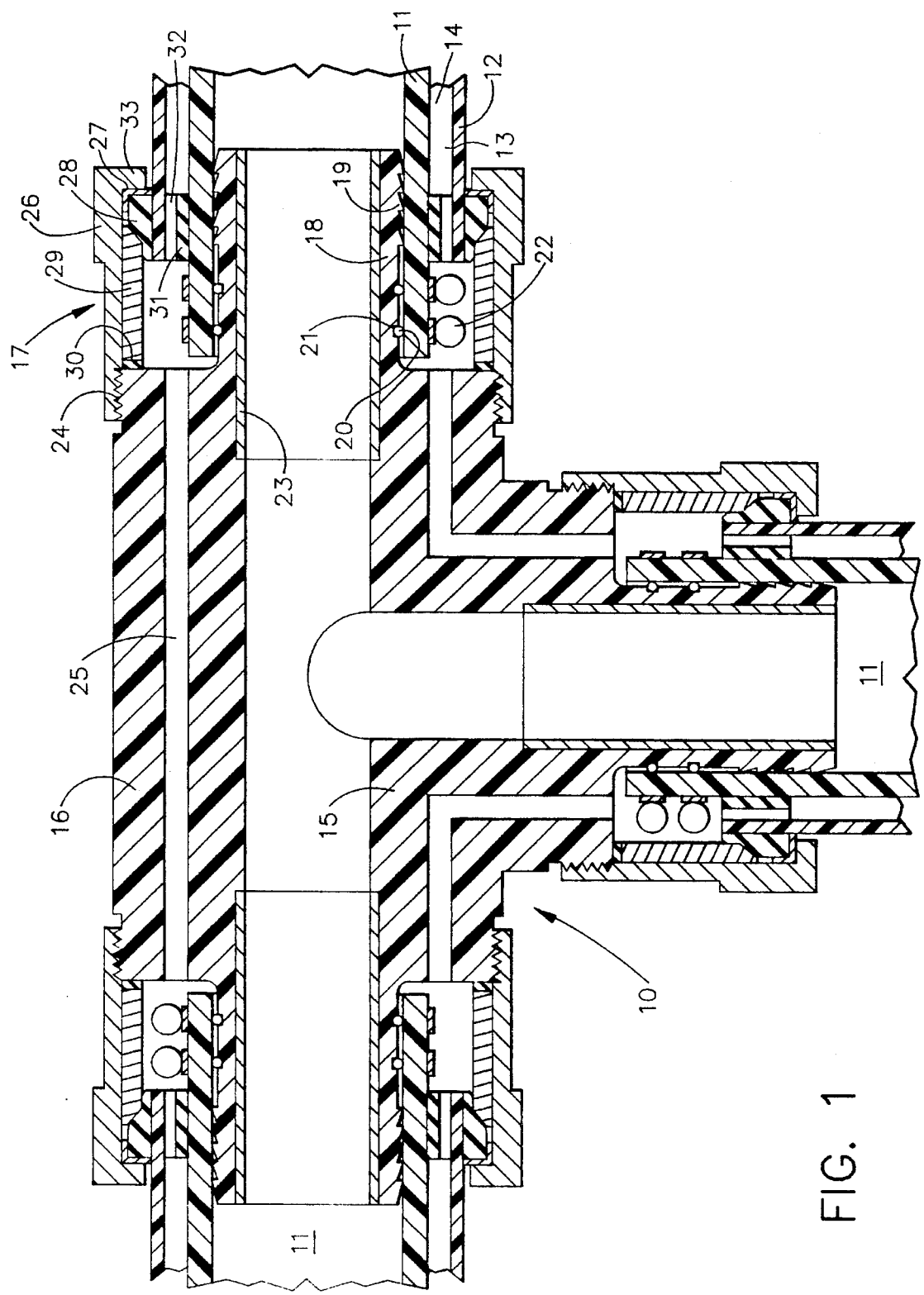
FIG. 1 is a side view in section of a double wall fitting of the invention attached to double wall pipeline systems.

The double wall compression fittings of the invention are useful with double wall pipeline systems. The fitting 10 depicted in FIG. 1 is a T-fitting having three terminals, each connected to a double wall pipeline system. Other fittings such as two terminal straight fittings, i.e. couplers, two terminal elbow fittings and four terminal cross fittings are within the scope of the invention and readily adapted from the disclosure of the T-fittings which follow.

Figure 2:
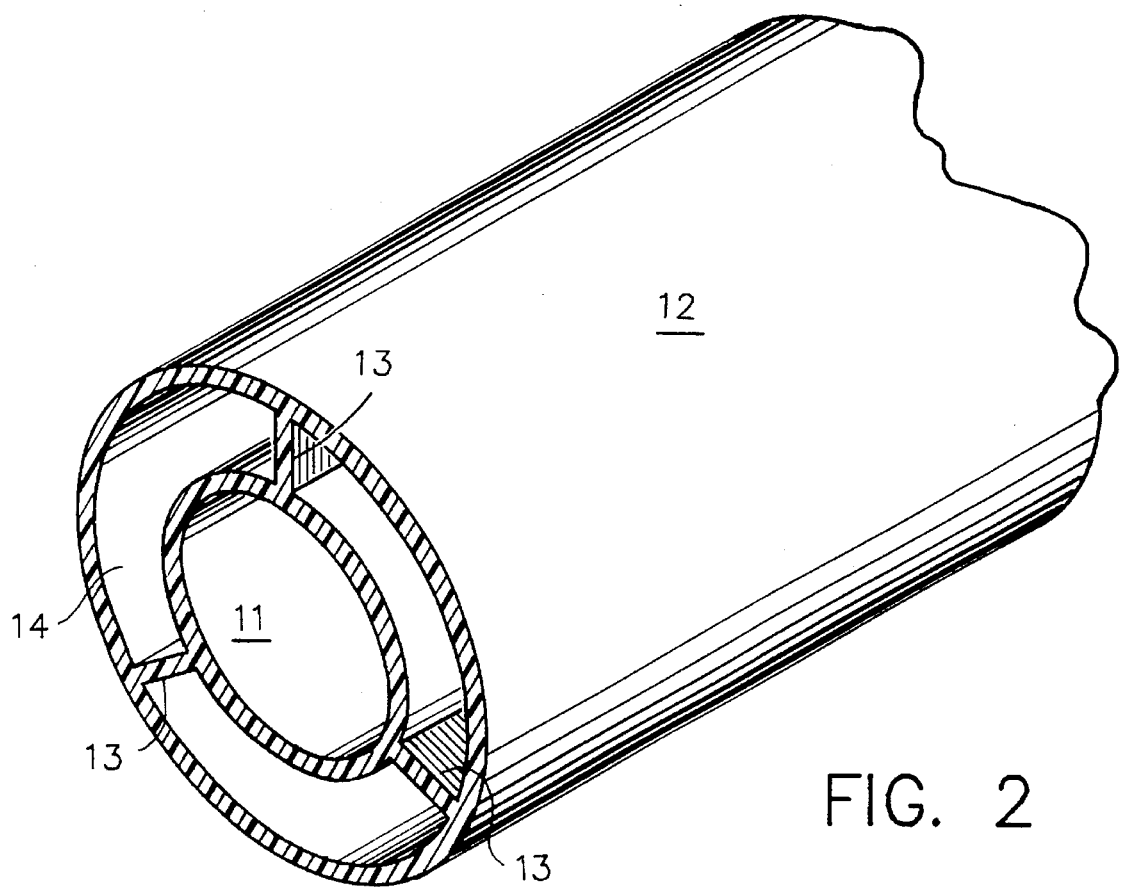
FIG. 2 is a view in perspective, in section, of the double wall pipeline system used with the double wall fitting of the invention shown in FIG. 1.
Figure 3:
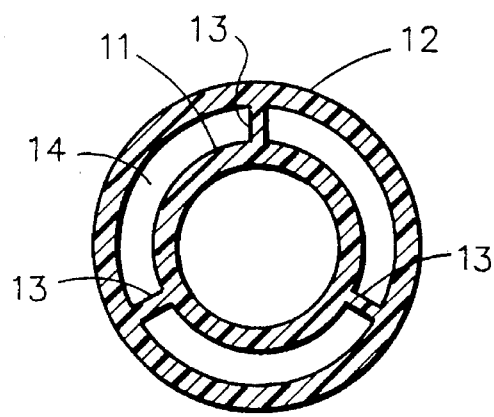
FIG. 3 is an end view in cross-section of the pipeline system of FIG. 2.

First with respect to FIGS. 2 and 3 there is shown a double wall pipeline system wherein the fittings of the invention are most useful. Such pipeline systems are commercially available. The system comprises an inner pipeline 11, an outer pipeline 12 and longitudinally running support fins 13. The pipeline system is a double wall pipeline of generally one piece construction. The inner pipeline has an outside diameter which ranges from about one-half inch to about twelve inches, depending on the liquid being conveyed and the purpose. Smaller and larger inner pipelines are feasible though generally find use in only very specialized technologies, such as medical technology and bulk water transport technology as found in airport hydrant systems. The outer pipeline is dimensioned to encase the inner pipeline with a minimal amount of clearance to conserve raw material usage. An annular space 14 is formed between the two pipelines. The length of the pipeline system can range widely depending on use, though generally as manufactured it will range from about three feet to about five hundred feet in length. A preferred length of the pipeline system for manufacturing purposes is from about six feet to about two hundred and fifty feet.

The wall thickness of the inner pipeline is dimensioned so as to be capable of withstanding at least about twice the operating pressure. Preferably, the system of the invention is capable of withstanding at least about 100 psi in the inner pipeline and at least about 10 psi in the outer pipeline. Necessarily, the inner pipeline conveying the liquid will constantly have the greater internal pressure. Any leakage which may occur will be into the larger capacity outer pipeline with a consequent step down in pressure. More preferably, the inner pipeline is capable of withstanding from about 100 psi to about 200 psi and the outer pipeline is capable of withstanding from about 10 psi to about 75 psi. Inner and outer pipeline thicknesses of from about 50 mils to about 350 mils is sufficient for these pressures.

The longitudinally running support fins 13 extend from the inner pipeline 11 to the outer pipeline 12. Each fin is preferably permanently joined to the wall of each pipeline so as to structurally tie the pipelines together. It is preferably perpendicular to each pipeline wall as best seen in FIG. 3. The resultant pipeline system is a one piece construction with enhanced strength. In effect each pipeline supports the other pipeline through the support fin. A support fin of about 50 mils to about 350 mils in thickness has been found to give the enhanced strength. Fins with a greater thickness give even greater strength to the system, though are not cost effective.

Still other double wall pipeline systems of the invention have any number of the longitudinally running support fins. From three to fifty support fins are preferred with three to eight support fins more preferred. The greater number of support fins in these preferred systems does allow a reduced fin thickness without a loss of overall strength. Thus, support fins of from about 25 mils to about 250 mils in thickness are sufficient. Generally, a greater pipeline system strength is achieved with increasing numbers of support fins, though a point ultimately is reached where there results no noticeable strengthening. Increased strengthening also results with increased pipeline wall thickness, especially the inner pipeline which conveys the liquid and thus is subjected to the greater operating pressure.

Again with reference to FIG. 1, there is shown the double wall compression fitting 10 having three terminals. The fitting 10 is used to connect three separate double wall pipeline systems. In accord with this invention, the fitting 10 used for the double wall pipeline systems ensures that the flow paths of liquid in the inner pipeline remains separate when passing through the fitting. Thus, each inner pipeline is connected to the fitting in a sealed manner so that liquid which flows through one inner pipeline will be forced to flow into one or more other inner pipelines. Similarly, a common separate path connects the annular spaces 14 between the three pipelines.

The double wall compression fitting 10 is comprised of an inner housing 15, an outer housing 16 substantially encasing the inner housing and a compression connecting assembly 17. Each of the components is described in detail below.

The inner housing 15 is preferably a one piece construction. The interior of it forms a flow path connecting the flow of liquid through the inner pipelines of the double wall pipeline systems. It is shown as made of a rigid plastic. It can as well be made of other materials, including steel or cast iron. Each leg of the inner housing has an externally recessed terminal 18, preferably with a series of ridges 19 extending around its circumference to better engage the inner pipeline and retain it when placed thereover. Preferably, though not necessary, O-rings 20 are positioned on the recessed terminals in O-ring grooves 21 to provide a seal with the inner pipeline. Band clamps 22 are also provided to compress the inner pipeline and O-rings onto the inner housing terminals to ensure a liquid-tight seal. Preferably, also, a metal reinforcing sleeve 23 is inserted in the terminals of the inner housing to keep them from collapsing.

The outer housing 16 substantially encases the inner housing 15. It has the same general shape, though its legs are shorter to allow access to the band clamps for tightening purposes. It is shown as made of a rigid plastic. It can as well be formed from other rigid materials or elastomeric materials. A terminal of each leg has exterior threads 24. An annular space 25 between the housings is formed which is in communication with the annular space 14 between the double wall pipelines through the compression connecting assembly described below.

The compression connecting assembly 17 is used to connect the outer pipelines of the double wall pipeline system to the outer housings of the T-fitting 10 in a sealed fashion while preserving the integrity of the liquid flow path and the annular space flow path. The compression connecting assembly 17 is comprised of an internally threaded coupler nut 26 dimensioned to engage the threads on the terminal of the outer housing 16, a gasket bearing retainer 27, a compression seal 28, a ram compression seat 29, a gasket 30 and a spacer 31 with communication means such as slots 32. The coupler nut 26 has an annular flange 33 extending inwardly at its head. The gasket bearing retainer 27 is a rigid ring with an inside diameter sufficiently large to fit over the outer pipeline 12 and further has a right angle leg which extends from the ring portion. The purpose of the retainer 27 is to receive force from the coupler nut when tightened and transmit it to the compression seal and at the same time confine the compression seal. A secondary benefit realized from the retainer is that it prevents the compression seal from binding against the coupler nut.

The compression seal 28 is a compressible ring which also has an inside diameter sufficient to fit over the outer pipeline and an outer diameter sufficient to be fit within the coupler nut 26 and gasket bearing retainer 27. The compression seal when compressed forms a seal between the outer pipeline 12 and the connecting assembly of the fitting 10.

The ram compression seat 29 is a rigid elongated sleeve which fits within the coupler nut. It has a length sufficient to contact the compression seal and outer housing end edge when the coupler nut 26 is tightened. The ram compression seat 29 and ring gasket 30 seated at the housing's end edge aid in forming a seal between the outer pipeline and outer housing.

Figure 6:
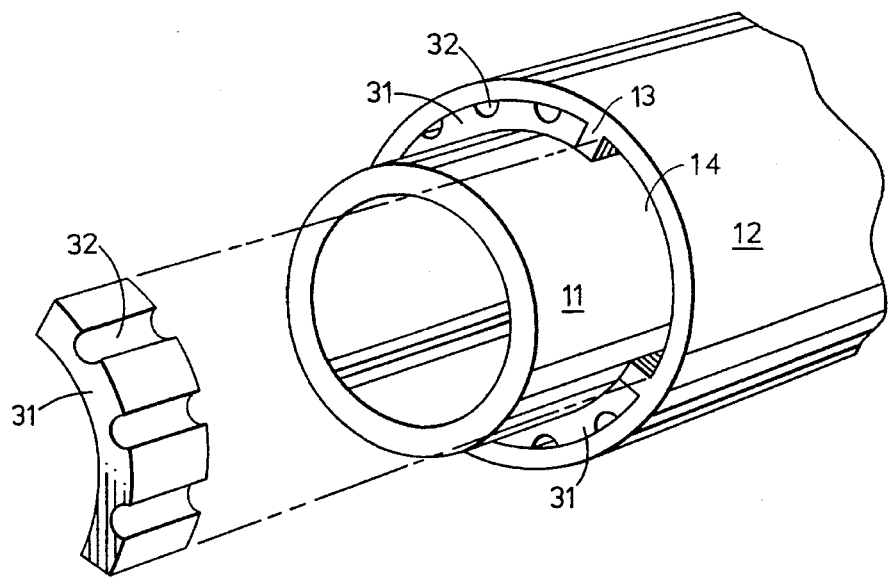
FIG. 6 is a perspective view of a double wall pipeline system with a section of a spacer forming a part of the fitting of FIG. 1 removed therefrom to show its operation.

As best seen in FIG. 6, the spacer 31 is ring-shaped with an inside diameter sufficient to fit over the inner pipeline and an outer diameter sufficient to fit within the inside of the outer pipeline. The spacer 31 is made in at least three sections, preferably substantially equal sections, dimensioned to accommodate the support fins. Three to six substantially equal sections are most preferred for ease of installing. More support fins may be needed with large diameter pipelines.

Slots 32 around the periphery of the spacer 31 serve as communication means between the annular space between the pipelines and the annular space between the housings. The number of slots, or alternatively ports, and placement in the spacer are not critical. At least one slot and preferably four to eight slots are used. While the slots can be provided on the outer periphery of the spacer, they can as well be on the inner periphery or interior of the spacer.

The spacer 31 is positioned between the inner and outer pipelines at their terminals and serves to prevent the pipelines from being crushed by compressive forces imparted by the coupler nut 26 and compression seal 28. It should be understood that crushing of the pipelines could impair the outer pipeline seal and/or block the annular spaces communication. Tightening of the outer coupler nut 26 forces the gasket bearing retainer 27, compression seal 28, ram compression seat 29 and gasket 30 together to form a seal to ensure that the annular space between the pipelines is closed to the outside. The spacer 31 is compressible and therefore it transmits the inward compressing force to the inner pipeline to form a seal. It could as well be made of a substantially non-compressible material in which case it primarily prevents the outer pipeline from crushing when the coupler nut is tightened.

It should be apparent that the fitting 10 is capable of attachment to a double wall pipeline system in a manner wherein the flow path of the inner pipeline remains the same and segregated and the annular space flow path between the pipelines remains the same and segregated. As such, liquid is able to flow through the inner pipeline of a double wall pipeline system, through the inner housing of the fitting and then through one or more inner pipelines of other double wall pipeline systems connected to the fitting. All the while, a continuous annular space is maintained.

Figure 4:
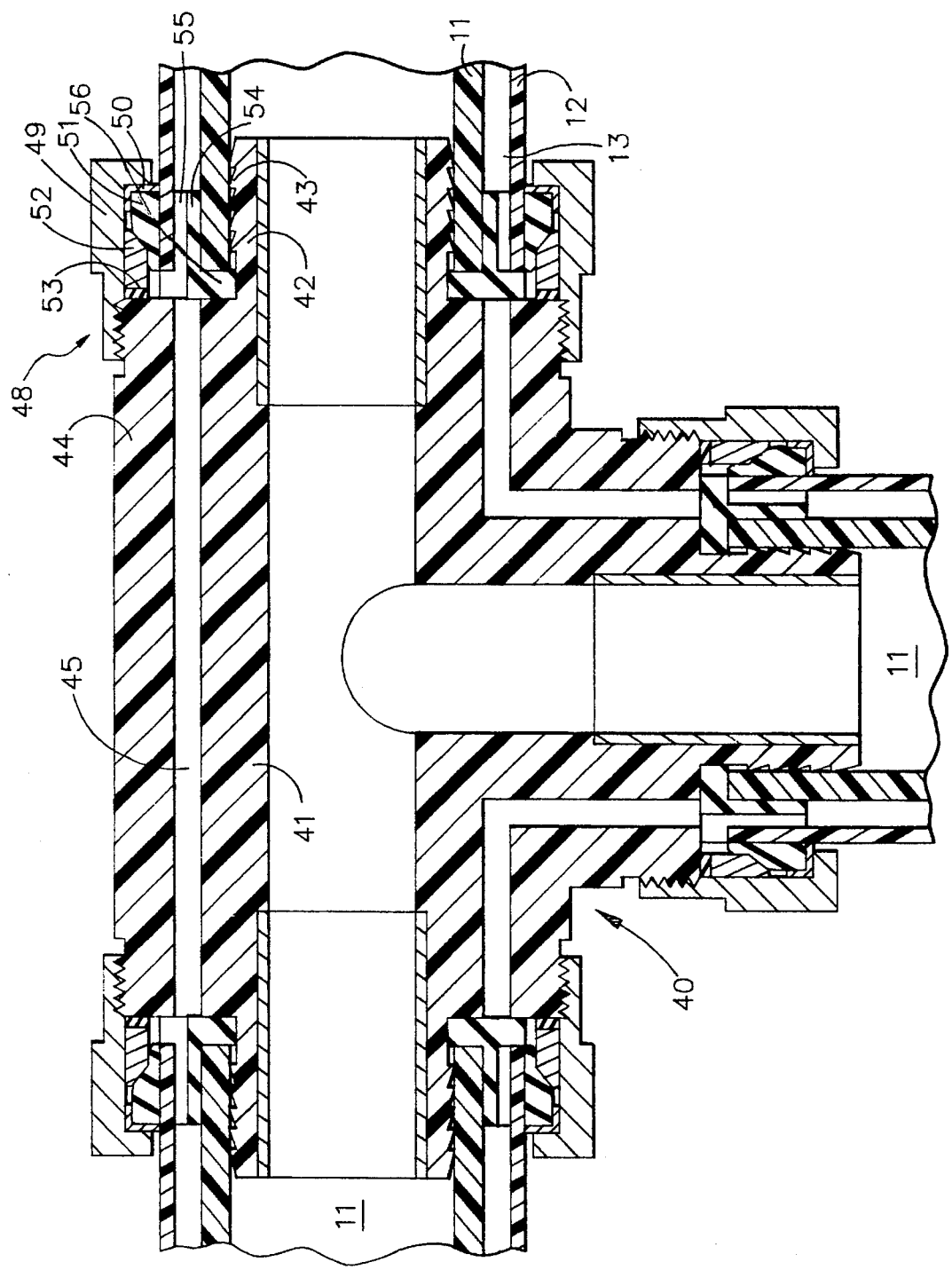
FIG. 4 is a side view in section of another double wall fitting of the invention.

FIG. 4 also shows a double wall T-fitting 40 with a double wall pipeline system as above described connected at each of three fitting openings. The fitting 40 is comprised of T-shaped inner housing 41 having externally recessed male terminals 42 with outer ridges 43 near the end of each opening for engaging the inner pipeline 12. As shown, the inner pipeline 11 is forced over the ridges 43 of the recessed male terminal a sufficient distance that it will remain in place. The inner housing 41 is encased by a T-shaped outer housing 44. An annular space 45 exists between the two housings.

Figure 7:
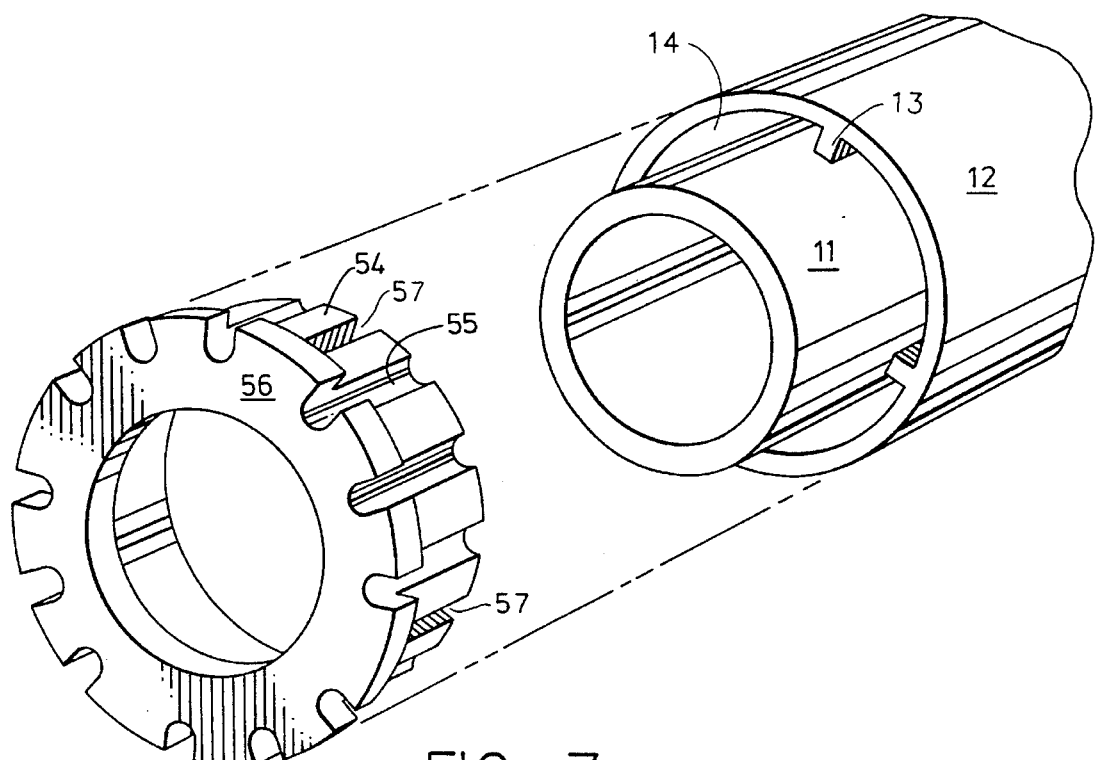
FIG. 7 is a view in perspective view of a double wall pipeline system with a section of a spacer forming a part of the fitting of FIG. 5 removed therefrom to show its operation.

A compression connecting assembly 48 is used to secure each double wall pipeline system to the fitting 40 in a liquid-tight fashion so that the annular space between the pipelines is sealed and in communication with the annular space 45 of the fitting. The compression connecting assembly 48 is comprised of an internally threaded coupler nut 49 dimensioned to engage threads on the outside wall of the outer housing 44, a gasket bearing retainer 50, a compression seal 51, a ram compression seat 52, a gasket 53 and a spacer 54 with lateral communication slots 55. The gasket bearing retainer, compression seal, ram compression seat and gasket are as described above with respect to FIG. 1 and perform the same respective functions. The spacer 54, however, is different to accommodate the different terminals of the pipeline system. Thus, as best seen in FIG. 7, the spacer 54 is a ring with an inside diameter substantially equal to the outside diameter of the inner pipeline 11 and an outside diameter substantially equal to the inside diameter of the outer pipeline 12. The spacer also has an annular flange 56 extending outwardly from its periphery a sufficient distance to be substantially equal with the outside diameter of the outer pipeline 12. As such, the spacer fits over the inner pipeline 11. Its flange 56 abuts against the end edge of the outer pipeline and its ring portion fits within the annular space between the inner and outer pipelines. A set of indents 57 in the ring are positioned to accommodate the support fins of the pipeline system. Lateral slots 55 extending around the periphery of the spacer including the flange 56 provides the communication means. As with the spacer 31 of FIG. 1, the spacer 54 can also be in sections.

Tightening of the compression connection assembly 48 ensures that the annular space between the outer pipeline is sealed to the outside. The spacer is compressible so that the tightening also compresses it inwardly to transmit a compressing force to the inner pipeline and to form a seal between the inner pipeline and inner housing.

The annular flange 56 found on the spacer of FIG. 4 is particularly desirable in that it aids the mechanic in the field to know if the components of the fitting are properly positioned before tightening of the coupler. The annular flange also helps to prevent pipeline creep when the fitting and the double wall pipeline are assembled and in use. It should be apparent that other spacers configured to have an annular flange are also possible. The flange can extend inwardly only and outwardly only. All three embodiments provide the anti-creep benefit to the pipeline. It should be understood that modifications to the pipeline terminals are needed to accommodate the particular spacer.

Figure 5:
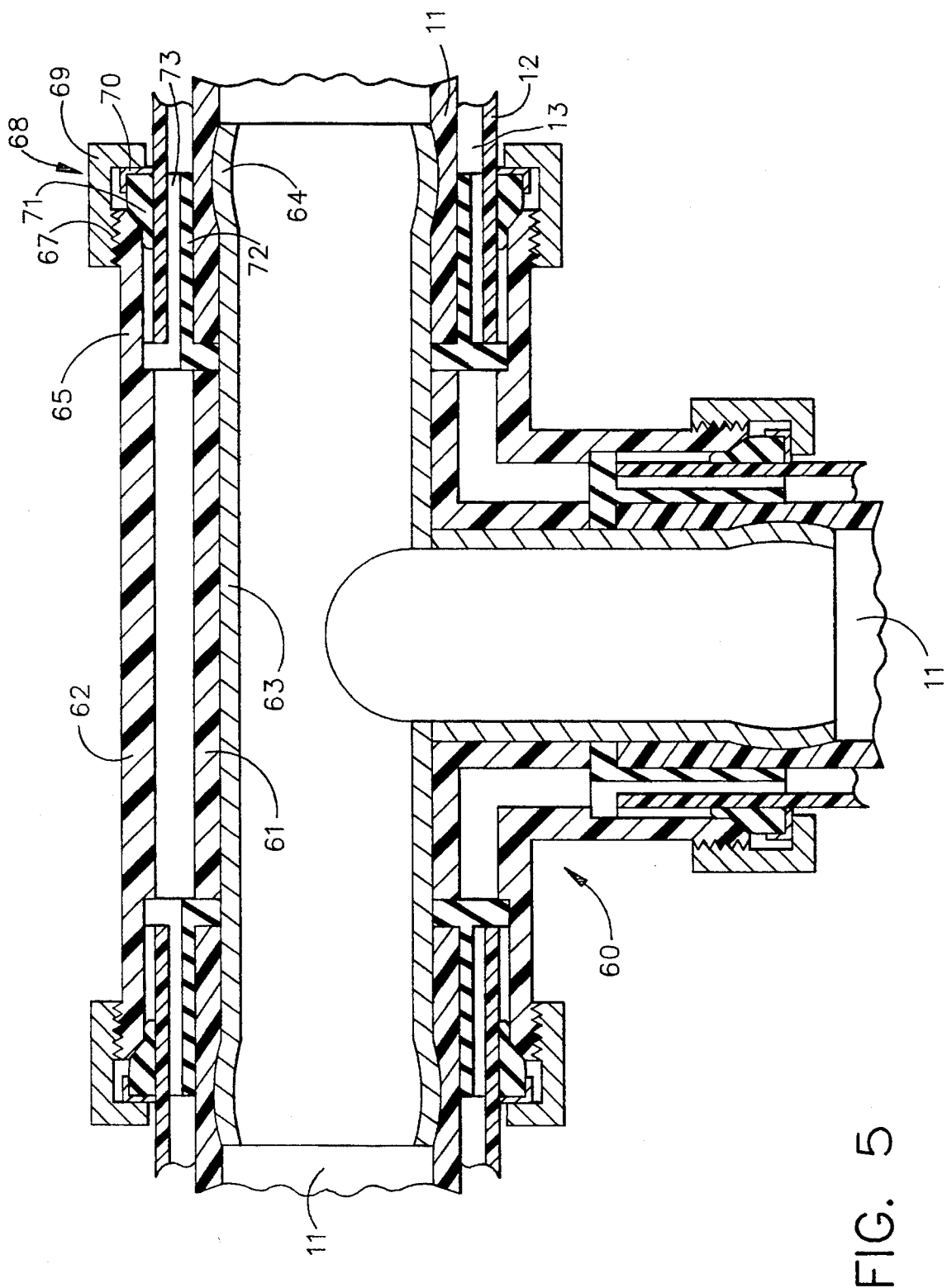
FIG. 5 is a side view in section of still another double wall fitting of the invention.

The double wall compression fitting of FIG. 5 illustrates an embodiment of the invention having still another means of forming a seal between an inner pipeline of a double wall pipeline system and a fitting. The fitting 60 comprises a T-shaped inner housing 61 with a T-shaped outer housing 62 wherein the terminals of the outer housing extend past the terminals of the inner housing. A T-shaped sleeve 63 is encased in the inner housing with its legs extending therefrom. Each leg has a flared end 64 over which the inner pipeline 11 of the double wall pipeline system is forced. The outer housing 62 has an internally recessed male terminal 65 on each end substantially overlying the end of the protruding T-shaped sleeve 63 extending from the inner housing 61 for purposes discussed below. The outer housing also has external threads 67 on each terminal.

The double wall pipeline systems are attached to the inner and outer housings of the fitting 60 by means of a compression connecting assembly 68. The assembly comprises an internally threaded coupler nut 69, a gasket bearing retainer 70, a compression seal 71 and a spacer 72 with lateral communication slots 73. The components coincide in their form and function with compression connecting assembly components described above with reference to FIG. 4. However, the assembly of FIG. 5 does not require a ram compression seat and gasket due to the particular configuration of the housings. Thus, the compression seal 71 of the fitting 60 is able to form a seal with the outer housing 62 by being forced by the coupler nut into direct contact with the housing's interior wall at or near a terminal.

Tightening of the coupler nut 69 of the compression connecting assembly 68 compresses the compression seal 71 directly against the outer housing end wall while also compressing the spacer 72 against the end wall of the inner housing 61 and the metal T-shaped sleeve 63. The combined actions ensure that the liquid flow path channel of the inner pipelines and the annular flow path channel between the inner and outer pipelines remains separate, i.e. they are sealed as they pass through the fitting 60.

Figure 8:
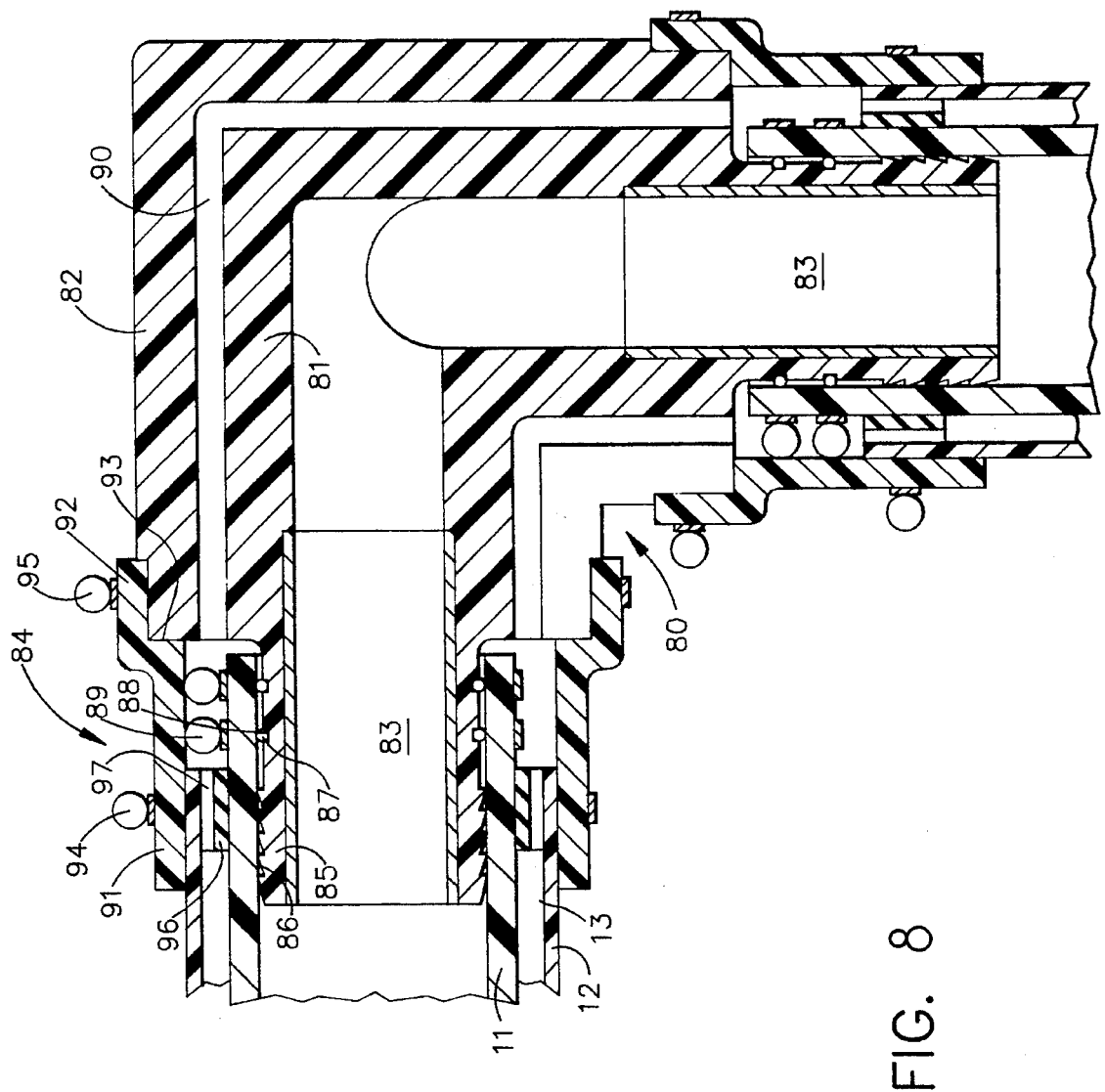
FIG. 8 is a side view in section of an elbow double wall fitting with a coupler assembly.

An elbow fitting with another compression connecting assembly is illustrated in FIG. 8. The double wall compression fitting 80 comprises right angle elbow inner housing 81 with an outer housing 82 encasing it. A metal sleeve 83 is positioned in each terminal of the inner housing 81 to keep the terminals from crushing from the compression connecting assemblies 84 during use. The inner housing has externally recessed male terminals 85 with ridges 86 extending therearound for enhanced pipeline retention. A set of O-rings 87 positioned in the O-ring grooves 88 on the male terminal 85 aid in obtaining a liquid-tight seal. Optional band clamps 89 on the inner pipeline 11 terminals provide additional sealing when tightened.

The compression connecting assembly 84 is comprised of a coupler 91, band clamps 94 and 95 and a spacer 96. The coupler 91 has an inside diameter which allows it to fit over the outer pipeline 12 and an annular flange 92 with an inside diameter which allows it to fit over the outer housing 82 of the double wall fitting 80. The inside wall of the flange 92 abuts against the end wall of the outer housing 82. The spacer 96 is compressible, though could be substantially non-compressible. In an alternative embodiment of the invention, the outer housing 82 and the coupler 91 can be molded, formed or machined to be one piece. This eliminates a need for the band clamps 95.

When the compression connecting assembly is properly positioned on the outer pipeline 12 and outer housing 82, the band clamps are tightened to form a compression seal between the coupler and the outer pipeline and outer housing. The spacer 96 of the type used with the double wall fitting of FIG. 1 is preferably compressed to aid in forming a seal between the inner pipeline 11 and the inner housing 81. Communication slots 97 in the spacer maintain communication between the annular space between the pipelines and the annular space 90 between the housings.

The fitting 80 is especially easy to install on a double wall pipeline system. It requires a minimum of components. Its ease of installation and reliability make it attractive when economics dictate a less expensive fitting.

Figure 9:
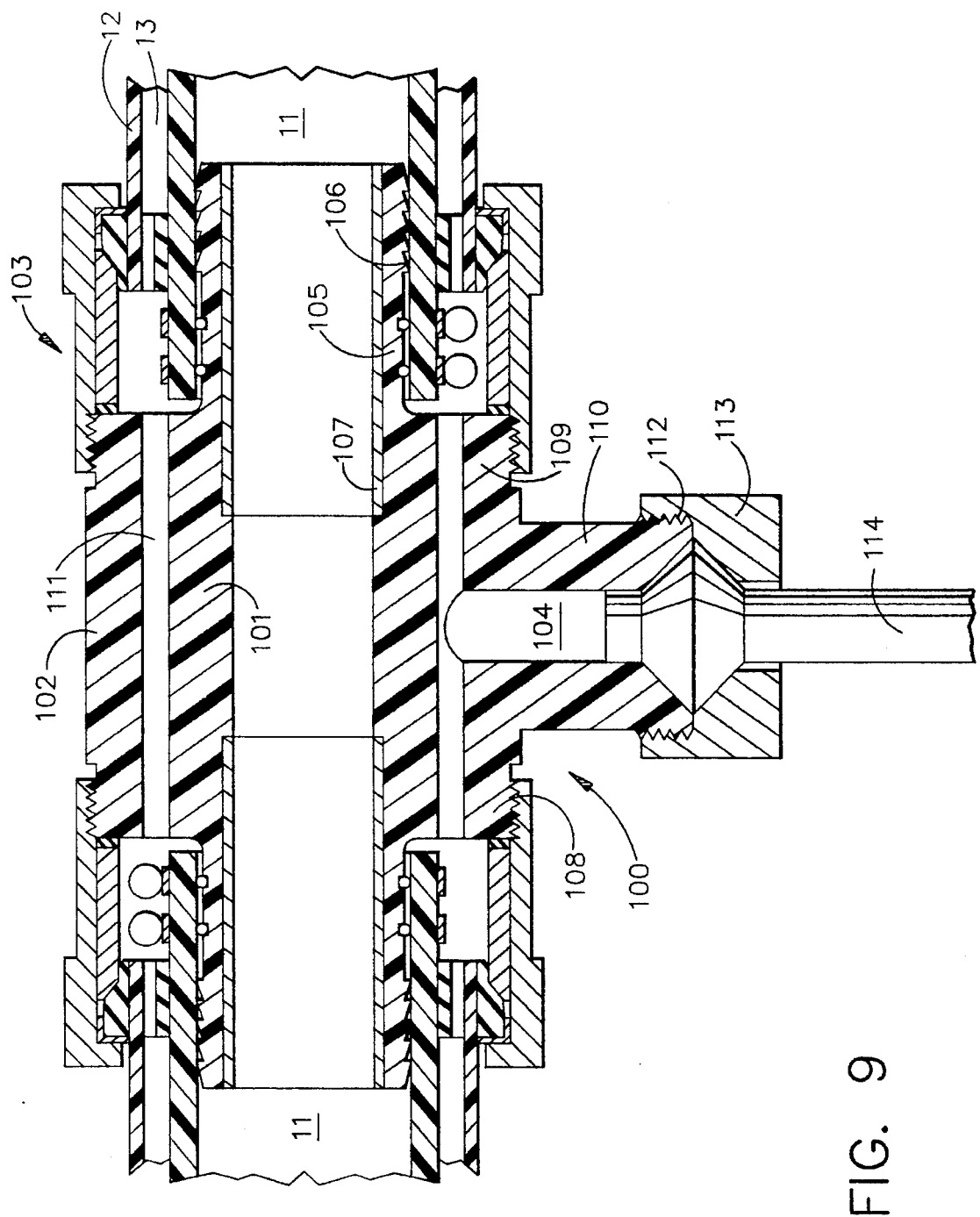
FIG. 9 is a side view of a double wall fitting having a means for monitoring an annular space between housings.

FIG. 9 illustrates a fitting of the invention having means to monitor an annular space between inner and outer housings of a fitting of the invention to detect pipeline leakage. The fitting 100 is essentially the T-fitting of FIG. 1 modified to have a detection port instead of a third pipeline terminal. The fitting is essentially a two terminal straight coupler. The fitting 100 has an inner housing 101, an outer housing 102, compression connecting assemblies 103 and a detection access port 104. The inner housing is a straight tube with externally recessed male terminals 105 at each end. Exterior ridges 106 are provided on the terminals to engage a pipeline and retain it in place. A metal sleeve 107 is positioned in each terminal to reinforce the inner housing against crushing when the compression connecting assemblies 103 are tightened. The outer housing 102 is T-shaped with each leg having external threads. Two legs 108 and 109 overlie the terminals of the inner housing while a third leg 110 accommodates the detection access port 104. The inner and outer housings have an annular space 111 therebetween.

The double wall pipeline systems are connected to legs 108 and 109 of the fitting 100 by means of the compression connecting assemblies 103. The assemblies and their mode of operation are the same as described above with reference to the double wall fitting of FIG. 1. When connected, the liquid flow channel of the inner pipeline 11 is directed through the inner housing 101 and through another inner pipeline 11. Similarly, the annular space between the inner and outer pipeline is in communication with the annular space 111 between the housings. The flow paths are sealed and remain separate due to the unique fitting 100, including its compression connecting assemblies 103.

The detection access port 104 communicates with the annular space 111 between the housings. The leg 110 is provided with external threads 112 and a coupler nut 113 to hold in place an access line 114. The access line 114 leads to a detection means (not shown). In this embodiment of the invention, the annular space between the pipelines is monitored to determine any leakage in either pipeline. When not in use, the detection access port can be closed with a cap nut.

It should be understood that all manners of fittings needed in the single wall piping industry are now available in the double wall piping industry. Most importantly, the separate flow paths provided by the double wall pipelines and their advantages are retained and continued through use of the double wall fittings of this invention.

While the invention has been described with particular reference to the drawings, other variations and obvious modifications of the described system are considered within the scope of the invention. For example, all manners of attachment means can be used to seal the inner pipelines to the inner housings of the fitting including the disclosed O-rings, band clamps and ridges as well as adhesives, threads, etc. Also, all manners of double wall pipelines can as well be used with ready adaptation of the disclosed fittings to the particular pipeline materials of construction and terminal configurations. All such obvious modifications are considered within the coverage of the appended claims.

What is claimed is:

1. A double wall compression fitting for attachment to a double wall pipeline system having an inner pipeline with terminals for conveying a liquid and an outer pipeline with terminals for containing liquid with an annular space and longitudinally running support fins between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:

a) an inner housing having at least two terminals;

b) an outer housing substantially encasing the inner housing in a manner such that an annular space between the housings is formed, said outer housing having at least two terminals; and c) a compression connecting assembly to engage the terminals of the inner pipeline and the terminals of the outer pipeline to the terminals of the inner and outer housings, said assembly having:

i) a coupler with means to compress the coupler to form a seal with the outer pipeline; and ii) a spacer positioned between the inner and outer pipelines to prevent said pipelines from being crushed by compressive forces imparted by the coupler, further wherein the spacer is configured to accommodate the support fins of the double wall pipeline system and has a means of communication between the annular space of the double wall pipeline system and the annular space between the housings.

2. The double wall compression fitting of claim 1 wherein the terminals of the inner housing are externally recessed and extend a sufficient distance beyond the terminals of the outer housing to accommodate band clamps around the inner housing terminals to secure the inner pipeline of the double wall pipeline system thereto.

3. The double wall compression fitting of claim 2 further comprising at least one O-ring positioned on each of the externally recessed terminals of the inner housing to ensure a sealed connection between each said terminal and each of the inner pipelines.

4. The double wall compression fitting of claim 1 wherein a band clamp is used to compress the coupler to the outer pipeline.

5. The double wall compression fitting of claim 1 wherein the outer housing has externally threaded terminals, the coupler is a coupler nut with matching internal threads and further having a compression seal positioned within the coupler nut to make sealing contact with the outer pipeline upon tightening of the coupler nut.

6. The double wall compression fitting of claim 5 wherein the compression seal is a compressible annular ring having an inside diameter sufficient to fit over the outer pipeline and an outside diameter sufficient to fit within the coupler nut whereinupon a compressive force from the coupler nut causes the compression seal to make sealing contact with the outer pipeline.

7. The double wall compression fitting of claim 6 wherein the compression connecting assembly further comprises a gasket bearing retainer positioned within the coupler nut, said gasket bearing retainer being a ring which fits over the outer pipeline and in contact with the compression seal to absorb force from the coupler nut and transmit it to the compression seal.

8. The double wall compression fitting of claim 7 wherein the compression connecting assembly further comprises a ram compression seat and a gasket in contact with the compression seal so that upon tightening of the coupler nut, the compression seal is forced to engage the ram compression seat and gasket to form a seal.

9. The double wall compression fitting of claim 1 wherein the spacer is an annular ring with an inside diameter sufficient to fit over the inner pipeline and an outside diameter sufficient to fit within the outer pipeline.

10. The double wall compression fitting of claim 9 wherein the spacer is compressible and is able to transmit compressing forces imparted to it by the coupler inwardly.

11. The double wall compression fitting of claim 9 wherein the spacer is substantially non-compressible to resist compressing forces from the coupler.

12. The double wall compression fitting of claim 10 wherein the spacer is a ring with an annular flange wherein the ring has an inside diameter sufficient to fit over the outside of the inner pipeline and an outside diameter sufficient to fit within the outer pipeline and the annular flange extends from the ring and abuts against an end edge of at least one pipeline.

13. The double wall compression fitting of claim 1 further wherein the inner housing has a metal sleeve in at least an end to resist crushing when a compressive force is exerted thereon.

14. The double wall compression fitting of claim 13 wherein the metal sleeve has a flared end dimensioned to hold the inner pipeline in a sealed fashion.

15. The double wall compression fitting of claim 1 wherein the spacer has at least three sections and each is dimensioned to fit between adjacent support fins.

16. The double wall compression fitting of claim 1 wherein the spacer has at least one lateral slot extending therethrough as the means of communication between the annular spaces.

17. The double wall compression fitting of claim 9 wherein the spacer has from three to six substantially equal sections for ease of installation.

18. A double wall compression fitting for attachment to a double wall pipeline system having an inner pipeline with terminals for conveying a liquid and an outer pipeline with terminals for containing liquid with an annular space and longitudinally running support fins between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:

a) an inner housing having at least two terminals, wherein said terminals are externally recessed and extend a sufficient distance beyond the terminals of an outer housing to accommodate band clamps around said inner housing terminals to secure the inner pipeline of the double wall pipeline system thereto;

b) an outer housing substantially encasing the inner housing in a manner such that an annular space between the housings is formed, said outer housing having at least two terminals; and c) a compression connecting assembly to engage the terminals of the inner pipeline and the terminals of the outer pipeline to the terminals of the inner and outer housings, said assembly having:
   i) a coupler with means to compress the coupler to form a seal with the outer pipeline; and
   ii) a spacer to make contact with the interior wall of the outer pipeline and to prevent said pipeline from being crushed by compressive forces imparted by the coupler, further wherein the spacer is configured to accommodate the support fins of the double wall pipeline system and has a means of communication between the annular space of the double wall pipeline system and the annular space between the housings.

19. The double wall compression fitting of claim 18 wherein a band clamp is used to compress the coupler to the outer pipeline.

20. The double wall compression fitting of claim 18 wherein the outer housing has externally threaded terminals, the coupler is a coupler nut with matching internal threads and further having a compression seal positioned within the coupler nut to make sealing contact with the outer pipeline upon tightening of the coupler nut.

21. The double wall compression fitting of claim 20 wherein the compression seal is a compressible annular ring having an inside diameter sufficient to fit over the outer pipeline and an outside diameter sufficient to fit within the coupler nut whereinupon a compressive force from the coupler nut causes the compression seal to make sealing contact with the outer pipeline.

22. The double wall compression fitting of claim 21 wherein the compression connecting assembly further comprises a gasket bearing retainer positioned within the coupler nut, said gasket bearing retainer being a ring which fits over the outer pipeline and in contact with the compression seal to absorb force from the coupler nut and transmit it to the compression seal.

23. The double wall compression fitting of claim 22 wherein the compression connecting assembly further comprises a ram compression seat and a gasket in contact with the compression seal so that upon tightening of the coupler nut, the compression seal is forced to engage the ram compression seat and gasket to form a seal.

24. The double wall compression fitting of claim 18 wherein the spacer is an annular ring with an inside diameter sufficient to fit over the inner pipeline and an outside diameter sufficient to fit within the outer pipeline.

25. The double wall compression fitting of claim 24 wherein the spacer is made of a compressible material and is able to transmit compressing forces imparted to it by the coupler inwardly.

26. The double wall compression fitting of claim 24 wherein the spacer is made of substantially non-compressible material to resist compressing forces from the coupler.

27. The double wall compression fitting of claim 18 wherein the spacer is a ring with an annular flange wherein the ring has an inside diameter sufficient to fit over the outside of the inner pipeline and an outside diameter sufficient to fit within the outer pipeline and the annular flange extends outwardly from the ring a sufficient distance to abut against an end edge of at least one pipeline.

28. The double wall compression fitting of claim 18 wherein the spacer has at least one lateral slot extending therethrough as the means of communication between the annular spaces.

* * * * *